United States Patent
Hirai et al.

(10) Patent No.: US 10,535,130 B2
(45) Date of Patent: Jan. 14, 2020

(54) LIFE DETERMINATION DEVICE, LIFE DETERMINATION METHOD, AND RECORDING MEDIUM FOR CUTTING TOOL

(71) Applicant: FANUC CORPORATION, Yamanashi (JP)

(72) Inventors: Toshio Hirai, Yamanashi (JP); Yasushi Okajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 20 days.

(21) Appl. No.: 15/630,187

(22) Filed: Jun. 22, 2017

(65) Prior Publication Data

US 2017/0372469 A1 Dec. 28, 2017

(30) Foreign Application Priority Data

Jun. 28, 2016 (JP) ................................. 2016-127242

(51) Int. Cl.
  *G06T 7/00* (2017.01)
  *G06T 7/90* (2017.01)

(52) U.S. Cl.
  CPC .............. *G06T 7/0004* (2013.01); *G06T 7/90* (2017.01); *G06T 2207/30164* (2013.01)

(58) Field of Classification Search
  CPC ............ B23Q 17/0995; B23Q 17/2457; B23Q 17/2471; G01B 5/28; G06T 7/0004; G06T 7/90; G06T 2207/30164; G06T 7/97
  USPC .................................................. 382/141, 152
  See application file for complete search history.

(56) References Cited

U.S. PATENT DOCUMENTS

| 4,854,161 | A |   | 8/1989 | Drits |            |
|-----------|---|---|--------|-------|------------|
| 5,251,144 | A | * | 10/1993 | Ramamurthi | ...... G05B 19/4065 |
|           |   |   |        |       | 700/177    |
| 5,571,957 | A | * | 11/1996 | Tanaka | ............... G05B 19/4065 |
|           |   |   |        |       | 73/104     |

FOREIGN PATENT DOCUMENTS

| JP | 60-263651 | 12/1985 |
| JP | 62-095849 | 6/1987 |
| JP | 4-75854 | 3/1992 |
| JP | 04-201050 | 7/1992 |
| JP | 05-087505 | 11/1993 |
| JP | 06-344246 | 12/1994 |
| JP | 11-160053 | 6/1999 |
| JP | 2001-092195 | 4/2001 |
| JP | 2004-070184 | 3/2004 |

(Continued)

OTHER PUBLICATIONS

Szeliski, Richard. Computer vision: algorithms and applications. Springer Science & Business Media, 2010. (Year: 2010).*

(Continued)

*Primary Examiner* — Geoffrey E Summers
(74) *Attorney, Agent, or Firm* — Wenderoth, Lind & Ponack, L.L.P.

(57) ABSTRACT

A life determination device comprises: an image acquiring unit that acquires an image showing a result of machining by cutting on a target of the machining by cutting; a feature quantity acquiring unit that acquires a feature quantity indicating the quality of the result of the machining by cutting from the image acquired by the image acquiring unit; and a life determining unit that determines the life of a cutting tool having been used for the machining by cutting on the target based on the feature quantity acquired by the feature quantity acquiring unit.

8 Claims, 6 Drawing Sheets

(56) References Cited

FOREIGN PATENT DOCUMENTS

| | | |
|---|---|---|
| JP | 2008-254080 | 10/2008 |
| JP | 2011-174874 | 9/2011 |

OTHER PUBLICATIONS

Shapiro, Linda, and George C. Stockman. Computer vision. 2000. (Year: 2000).*

Kurada, S., and C. Bradley. "A review of machine vision sensors for tool condition monitoring." Computers in industry 34.1 (1997): 55-72. (Year: 1997).*

Preston, Scott. "Trimmed Means." SUNY Oswego, 2000. (Year: 2000).*

Smith, Melvyn L. "The analysis of surface texture using photometric stereo acquisition and gradient space domain mapping." Image and vision computing 17.14 (1999): 1009-1019. (Year: 1999).*

Dutta, S., et al. "Detection of tool condition from the turned surface images using an accurate grey level co-occurrence technique." Precision Engineering 36.3 (2012): 458-466. (Year: 2012).*

Dutta, S., et al. "Application of digital image processing in tool condition monitoring: A review." CIRP Journal of Manufacturing Science and Technology 6.3 (2013): 212-232. (Year: 2013).*

Shahabi, H. H., and M. M. Ratnam. "In-cycle monitoring of tool nose wear and surface roughness of turned parts using machine vision." The International Journal of Advanced Manufacturing Technology 40.11-12 (2009): 1148-1157. (Year: 2009).*

"Inequalities." Math.com, Mar. 30, 2014, http://www.math.com/school/subject2/lessons/S2U3L4DP.html. (Year: 2014).*

Notification of Reasons for Refusal dated May 29, 2018 in Japanese Patent Application No. 2016-127242.

Notification of Reasons for Refusal dated Dec. 11, 2018 in Japanese Patent Application No. 2016-427242.

* cited by examiner

FIG. 4A
IMAGE CAPTURED FROM LEFT SIDE

MACHINING SURFACE

FIG. 4B
IMAGE CAPTURED FROM FRONT

MACHINING SURFACE

FIG. 4C
IMAGE CAPTURED FROM RIGHT SIDE

MACHINING SURFACE

LIFE DETERMINATION DEVICE, LIFE DETERMINATION METHOD, AND RECORDING MEDIUM FOR CUTTING TOOL

This application is based on and claims the benefit of priority from Japanese Patent Application No. 2016-127242, filed on 28 Jun. 2016, the content of which is incorporated herein by reference.

BACKGROUND OF THE INVENTION

Field of the Invention

The present invention relates to a life determination device, a life determination method, and a recording medium for a cutting tool.

Related Art

Machining by cutting has conventionally been done on production lines, etc. using cutting tools. In a machining by cutting step, various intended types of machining have been done on a target using a device with an attached cutting tool responsive to each type of machining. The precision of such machining by cutting has been affected by the wear of the attached cutting tool. Hence, according to a method having generally been employed, a permitted duration of use specific to each type of a tool is set. If a total processing time reaches the end of the permitted duration of use, a cutting tool is replaced. Patent document 1 describes a technique of predicting the life of a tool by irradiating a surface of a machining target with a laser pulsed beam and evaluating the accuracy of dimension measured using light resulting from reflection of the pulsed beam.

Patent Document 1: Japanese Unexamined Patent Application, Publication No. H04-75854

SUMMARY OF THE INVENTION

Meanwhile, a proper permitted duration of use of a cutting tool cannot easily be determined uniformly, but it has been determined in consideration of multiple factors including "a tool type," "the shape of a machining target," "the quality of the machining target," or "a machining condition," for example. Hence, a permitted duration of use of a cutting tool has actually been determined for each device to be used for machining, based on the state of wear of the cutting tool or machining precision, for example. Further, even after a permitted duration of use is determined once, this duration of use should be revised, where necessary, as it changes in a manner that depends on the type of a target of machining by cutting, or the proportion of the target. The technique described in patent document 1 is to measure the variation of the dimension of a rotated member to be cut determined in a radial direction of the member using the light resulting from reflection of the laser pulsed beam. Hence, application of this technique has been limited to a particular style of machining. Further, this technique has been considered to be not always capable of determining the wear of a cutting tool itself precisely. As described above, the conventional technique has found it difficult to determine the life of a cutting tool properly.

It is an object of the present invention to more appropriately determine the life of a cutting tool.

(1) To achieve the above-described object, a life determination device (a life determination device 1 described later, for example) according to one aspect of the present invention comprises: an image acquiring unit (an image acquiring unit 21a described later, for example) that acquires an image showing a result of machining by cutting on a target of the machining by cutting; a feature quantity acquiring unit (a contrast acquiring unit 21b described later, for example) that acquires a feature quantity indicating the quality of the result of the machining by cutting from the image acquired by the image acquiring unit; and a life determining unit (a life determining unit 21c described later, for example) that determines the life of a cutting tool having been used for the machining by cutting on the target based on the feature quantity acquired by the feature quantity acquiring unit.

(2) In the life determination device according to (1), the image acquired by the image acquiring unit may include multiple images, the feature quantity acquiring unit may acquire the feature quantities from the multiple images, and the life determining unit may determine the life of the cutting tool having been used for the machining by cutting on the target based on change with time in the feature quantities acquired by the feature quantity acquiring unit.

(3) In the life determination device according to (2), the life determining unit may determine the life of the cutting tool having been used for the machining by cutting on the target based on an average of the feature quantities over a predetermined period of time.

(4) In the life determination device according to (2), the life determining unit may determine the life of the cutting tool having been used for the machining by cutting on the target based on an average of feature quantities obtained by excluding at least a predetermined number of high values or a predetermined number of low values from the feature quantities over a predetermined period of time.

(5) In the life determination device according to any one of (1) to (4), the image acquiring unit may acquire images of a part captured from multiple directions, the part being a part of the target of the machining by cutting and having been subjected to the machining by cutting.

(6) In the life determination device according to any one of (1) to (5), the feature quantity acquired by the feature quantity acquiring unit may be a contrast of the image.

(7) A life determination method according to one aspect of the present invention comprises: an image acquiring step of acquiring an image showing a result of machining by cutting on a target of the machining by cutting; a feature quantity acquiring step of acquiring a feature quantity indicating the quality of the result of the machining by cutting from the image acquired by the image acquiring step; and a life determining step of determining the life of a cutting tool having been used for the machining by cutting on the target based on the feature quantity acquired by the feature quantity acquiring step.

(8) A program according to one aspect of the present invention causes a computer to realize: an image acquiring function of acquiring an image showing a result of machining by cutting on a target of the machining by cutting; a feature quantity acquiring function of acquiring a feature quantity indicating the quality of the result of the machining by cutting from the image acquired by the image acquiring function; and a life determining function of determining the life of a cutting tool having been used for the machining by cutting on the target based on the feature quantity acquired by the feature quantity acquiring function.

The present invention is capable of more appropriately determining the life of a cutting tool.

DETAILED DESCRIPTION OF THE INVENTION

An embodiment of the present invention will be described below by referring to the drawings.

[Configuration]

Figure 1:
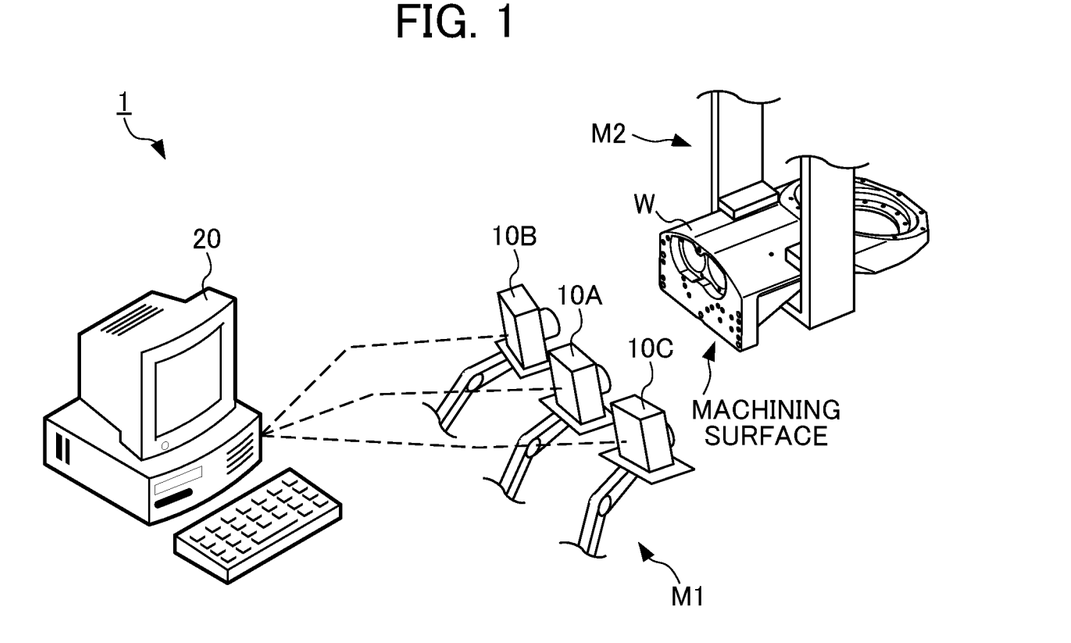
FIG. 1 is a schematic view showing the configuration of a life determination device according to an embodiment of the present invention.

FIG. 1 is a schematic view showing the configuration of a life determination device 1 according to the embodiment the present invention. The life determination device 1 according to the embodiment is a device that captures images of machining surfaces of multiple targets (hereinafter called "works W") after being subjected to machining by cutting, and determines the life of a cutting tool based on change with time in contrasts (feature quantities indicating the qualities of results of the machining by cutting) in the captured images of the machining surfaces.

As shown in FIG. 1, the life determination device 1 includes an imaging unit 10A, an imaging unit 10B, an imaging unit 10C, and a processor 20. The imaging units 10A to 10C are each formed of a unit that captures an image of a machining surface of the work W after being subjected to machining by cutting. The imaging unit 10 described in this embodiment is formed of a digital camera. However, a different imaging unit such as an infrared camera is usable, as long as such an imaging unit can capture an image of the machining surface of the work W.

Figure 2:
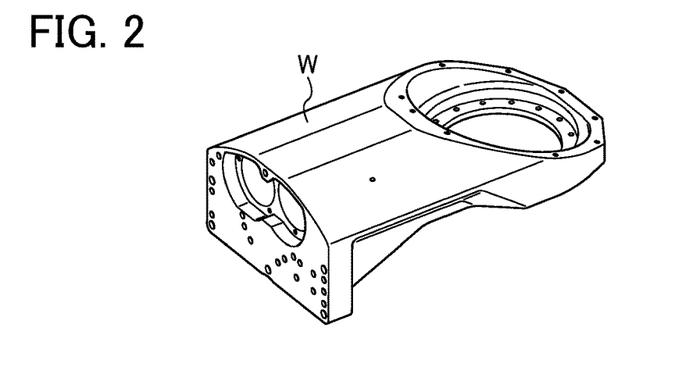
FIG. 2 is a schematic view showing an example of a work W after being subjected to machining by cutting.
Figure 3A:
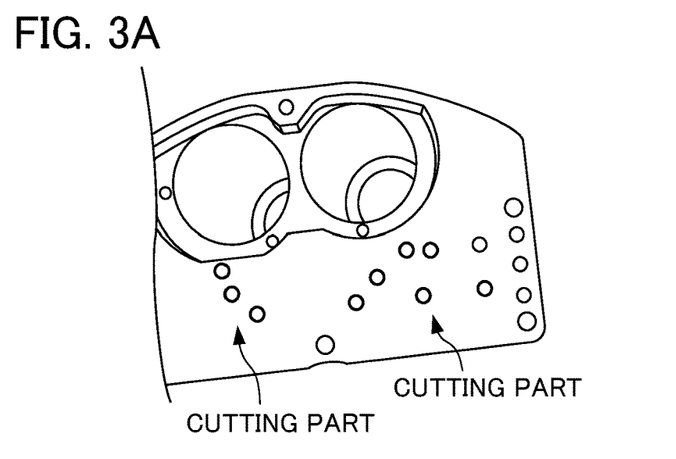
FIG. 3A shows a result of machining obtained at an initial stage of use of a cutting tool after use of the cutting tool is started.
Figure 3B:
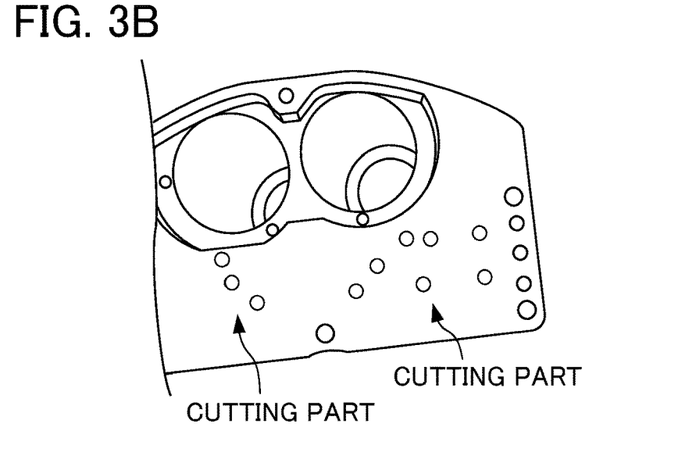
FIG. 3B shows a result of machining obtained at a stage immediately before replacing the cutting tool necessitated by reaching the end of the life of the cutting tool.

FIG. 2 is a schematic view showing an example of the work W after being subjected to machining by cutting. FIGS. 3A and 3B are schematic views each showing an example of the machining surface of the work W. FIG. 3A shows a result of machining obtained at an initial stage of use of a cutting tool after use of the cutting tool is started. FIG. 3B shows a result of machining obtained at a stage immediately before replacing the cutting tool necessitated by reaching the end of the life of the cutting tool. In FIGS. 3A and 3B, the line width of each circle indicating a cutting part is responsive to the contrast level. A greater line width shows a higher contrast. The imaging units 10A to 10C capture images of the machining surfaces of the multiple works W, and the machining surface of one of these works W is shown in FIG. 2. The contrasts of the images of the machining surfaces of the multiple works W change in a manner that depends on the life of a cutting tool. In the state of FIG. 3A obtained at the initial stage of use of the cutting tool after use of the cutting tool is started, the quality of the cutting is high so the contrasts of the images are high. In the state of FIG. 3B obtained at the stage immediately before replacing the cutting tool, the quality of the cutting is reduced relatively, reducing the contrasts of the images.

The imaging units 10A to 10C capture images of the machining surface of the work W from respective different directions. According to this embodiment, the imaging unit 10A captures an image of the machining surface of the work W from the front, the imaging unit 10B captures an image of the machining surface of the work W from the left side of the front, and the imaging unit 10C captures an image of the machining surface of the work W from the right side of the front. This allows acquisition of images of the machining surface of the same work W captured from the multiple different directions, so that the shape of the machining surface of the work W can be grasped more precisely.

Figure 4A:
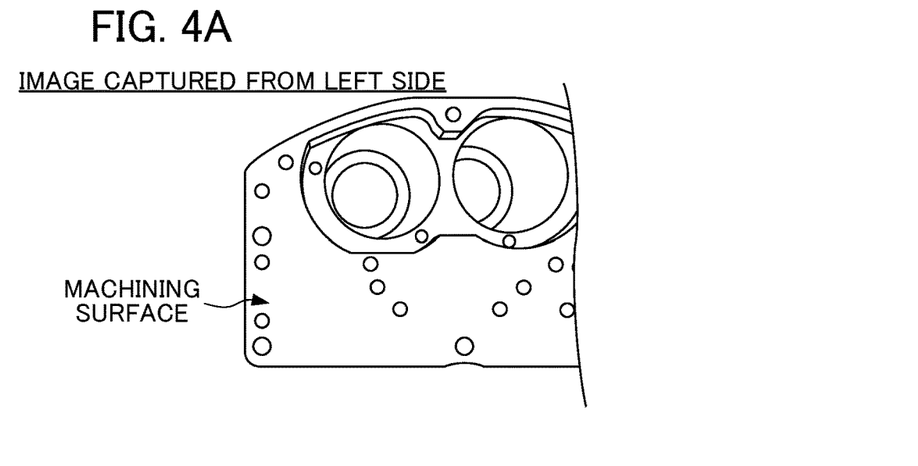
FIG. 4A shows an image of a machining surface of the work W captured from the left side of the front.
Figure 4B:
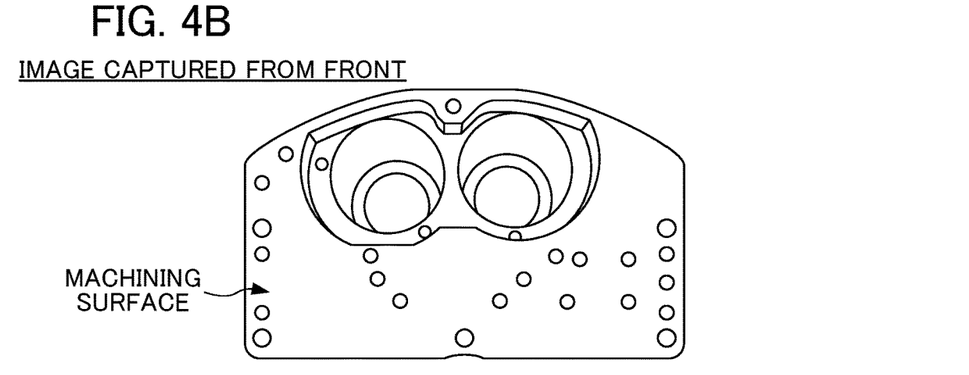
FIG. 4B shows an image of the machining surface of the work W captured from the front.
Figure 4C:
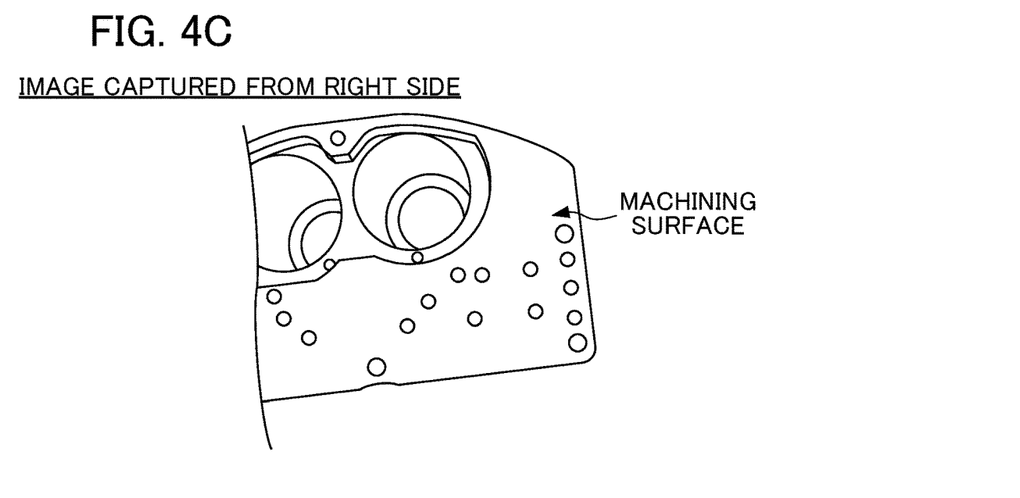
FIG. 4C shows an image of the machining surface of the work W captured from the right side of the front.

FIGS. 4A to 4C are schematic views showing images of the machining surface of the work W captured from different directions. FIG. 4A shows an image of the machining surface of the work W captured from the left side of the front. FIG. 4B shows an image of the machining surface of the work W captured from the front. FIG. 4C shows an image of the machining surface of the work W captured from the right side of the front. As shown in FIGS. 4A to 4C, the imaging units 10A to 10C capture images of the machining surface of the work W from the multiple different directions, and the acquired images show a result of machining.

The imaging units 10A to 10C capture images of the machining surfaces of the multiple works W under conditions (parameters including a shutter speed, an aperture value, an angle of view, the brightness level of illumination, sensitivity, and white balance, for example) equally set for the multiple works W. This allows acquisition of images precisely indicating the states of the machining surface of the multiple works W without being affected by differences between the imaging conditions.

The positions of the imaging units 10A to 10C and that of the machining surface of the work W as an imaging target are determined relative to each other by a device that controls at least the positions and the postures of the imaging units 10A to 10C, or the position and the posture of the work W. According to this embodiment, to determine the positions of the imaging units 10A to 10C and that of the machining surface of the work W as an imaging target relative to each other, a robot M1 for gripping the imaging units 10A to 10C is used to control the positions of the imaging units 10A to 10C and directions of imaging by the imaging units 10A to 10C, whereas a robot M2 for gripping the work W is used to control the position and the posture of the work W.

Figure 5:
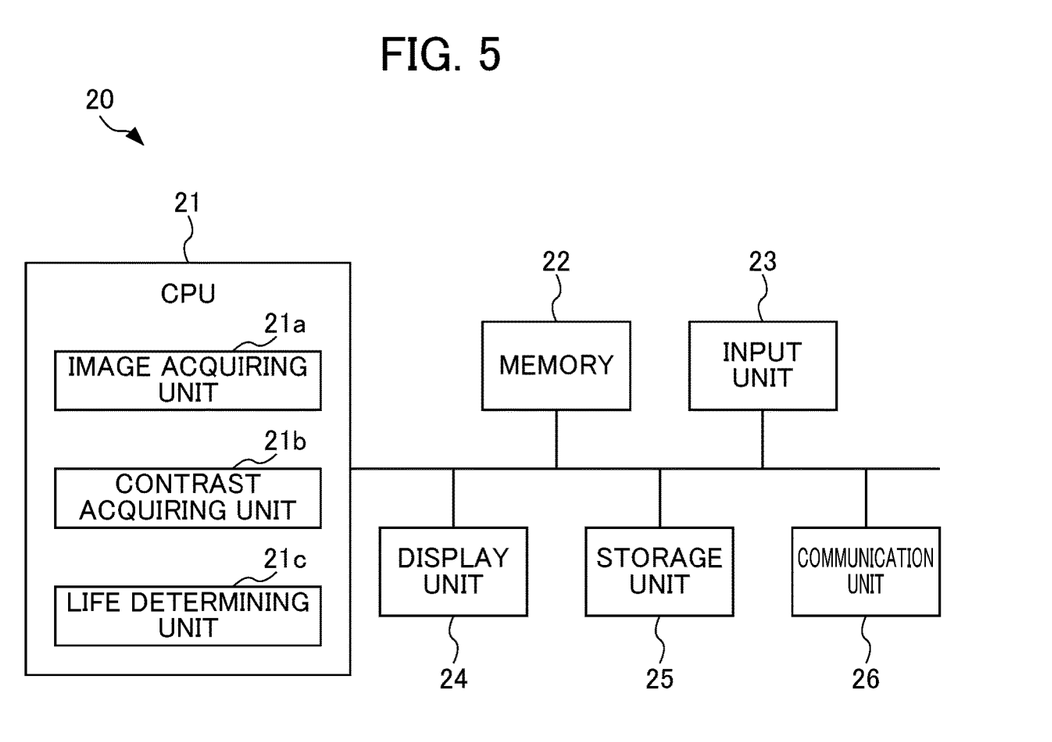
FIG. 5 is a block diagram showing the configuration of a processor.

The processor 20 determines the life of a cutting tool based on images of the machining surface of the work W captured by the imaging units 10A to 10C. FIG. 5 is a block diagram showing the configuration of the processor 20. As shown in FIG. 5, the processor 20 includes a central processing unit (CPU) 21, a memory 22, an input unit 23, a display unit 24, a storage unit 25, and a communication unit 26.

The CPU 21 controls the life determination device 1 entirely by executing various programs stored in the storage unit 25. For example, the CPU 21 executes a program for life determination processing for determining the life of a cutting tool. Execution of the program for the life determination processing forms functional structures in the CPU 21 including an image acquiring unit 21a, a contrast acquiring unit 21b, and a life determining unit 21c.

The image acquiring unit 21a acquires image data (images captured from the front, from the left side, and from the right side) of the machining surface of the work W captured by the imaging units 10A to 10C. With three images of the same work W captured from the different directions classified in one group, the image acquiring unit 21a stores image data belonging to groups corresponding to multiple works W into the storage unit 25 in association with the machining time-series. In this way, image data of the machining surface of each work W captured from the multiple directions is stored in the storage unit 25 in order of the machining.

The contrast acquiring unit 21b acquires data indicating contrasts (feature quantities) from data about the images of the machining surfaces of the multiple works W stored in the storage unit 25. For example, the contrast acquiring unit 21b calculates a contrast in a region (hereinafter called a "target region") set in advance in data about each image of the machining surface of the work W. The target region can be set by determining a particular cutting part (one part or multiple parts) in data about each image of the machining surface of the work W as a sample. Alternatively, a partial region or an entire region of an image of the machining surface of the work W can be set as the target region. According to this embodiment, the target region is a partial region belonging to an image of the machining surface of the work W, including a cutting part.

Figure 6:
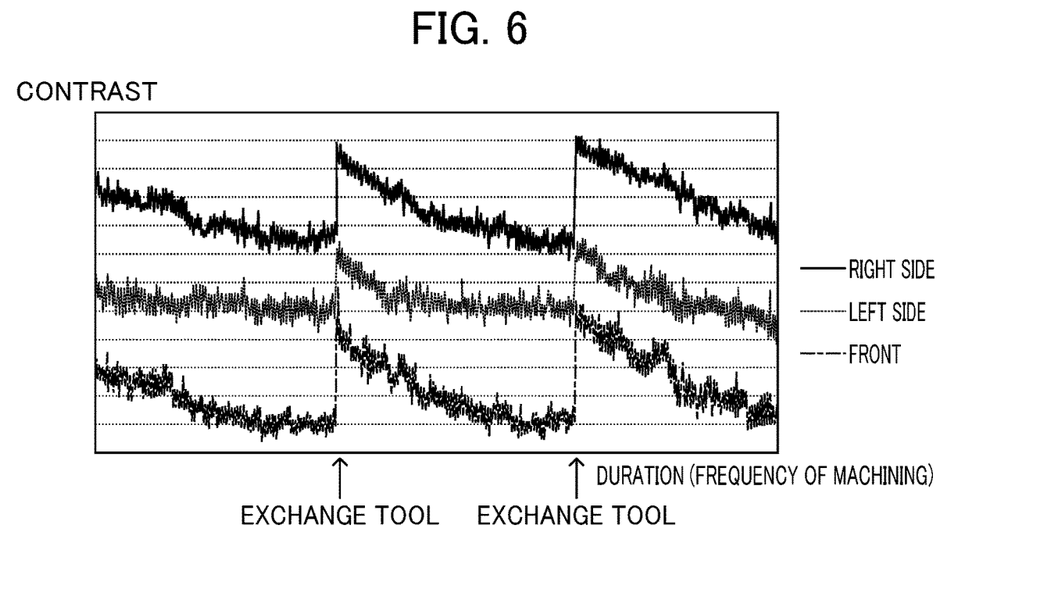
FIG. 6 is a schematic view showing an example of data indicating contrasts acquired by a contrast acquiring unit.
Figure 7:
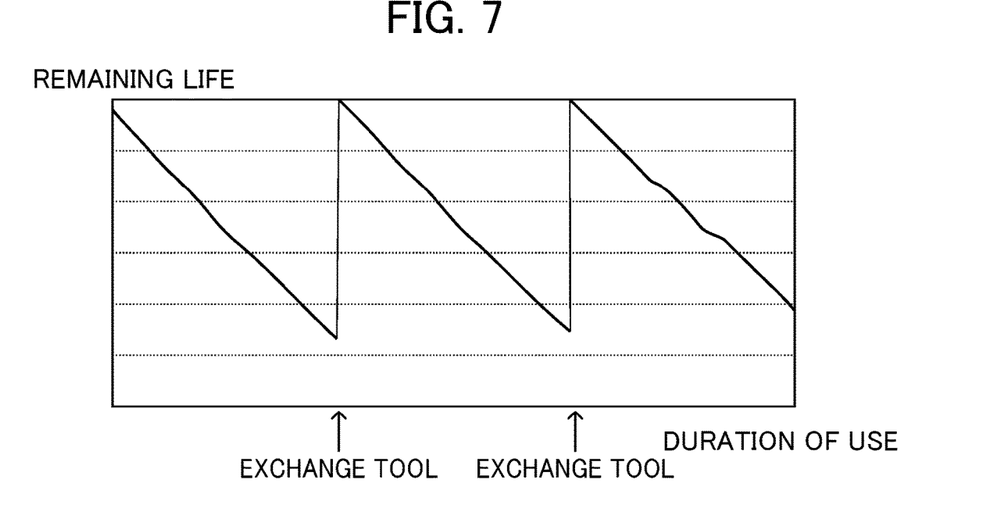
FIG. 7 is a schematic view showing a relationship between the duration of use of the cutting tool and the remaining life of the cutting tool.

FIG. 6 is a schematic view showing an example of data indicating contrasts acquired by the contrast acquiring unit 21b. FIG. 6 shows contrasts in a time-series manner in image data of the machining surfaces of the multiple works W captured by each of the imaging units 10A to 10C. Referring to FIG. 6, alternate long and short dashed lines show contrasts in image data of the front captured by the imaging unit 10A, broken lines show contrasts in image data of the left side captured by the imaging unit 10B, and solid lines show contrasts in image data of the right side captured by the imaging unit 10C. FIG. 7 is a schematic view showing a relationship between the duration of use of a cutting tool and the remaining life of the cutting tool. FIG. 7 shows process during which the cutting tool is replaced with a new tool each time the cutting tool has reached the end of its predetermined remaining life. The data indicating contrasts shown in FIG. 6 corresponds to the data about the process shown in FIG. 7. As shown in FIG. 6, observation in a time-series manner of the contrasts of the images captured by each of the imaging units 10A to 10C shows that contrasts are high at an initial stage of use of a cutting tool after use of the cutting tool is started, and contrasts are reduced gradually with increase in the frequency of the machining. The observation also shows that, once the cutting tool is replaced, contrasts of the images captured by each of the imaging units 10A to 10C increase to high values again.

The life determining unit 21c determines the life of a cutting tool based on the data indicating a contrast acquired by the contrast acquiring unit 21b. More specifically, the life determining unit 21c determines the life of the cutting tool by determining change with time in a contrast in data about each image based on a previously set determination criterion (if appropriate, this criterion will be called a "life determination criterion for a cutting tool").

For example, the life determination criterion for a cutting tool can be the following determination criteria. According to this embodiment, a determination based on any of the following criteria is made on each image captured by each of the imaging units 10A to 10C.

(Determination Criterion 1)
A threshold (absolute value) of a contrast is set in advance. The life of a cutting tool is determined based on a result of comparison between a contrast in data about each image and the threshold.

(Determination Criterion 2)
The life of a cutting tool is determined by determining whether or not a contrast has reached a value obtained by subtracting a certain value from a contrast initial value (a value obtained immediately after replacing the cutting tool).

(Determination Criterion 3)
The life of a cutting tool is determined by determining whether or not a contrast has reached a value obtained by multiplying a contrast initial value (a value obtained immediately after replacing the cutting tool) by a constant (for example, by multiplying the initial value by n/m, where m and n are integers).

(Determination Criterion 4)
The life of a cutting tool is determined based on a variation range of a contrast.

(Determination Criterion 5)
The life of a cutting tool is determined based on a change rate of a contrast.

(Determination Criterion 6)
The life of a cutting tool is determined based on a result of comparison with previous data about a contrast. According to an exemplary embodiment of the determination criterion 6, the life of a cutting tool currently used can be determined based on similarity to data about a contrast obtained by one, or multiple cutting tools used in the past.

One, or two or more of the above-described determination criteria can be selected and employed in a manner that conforms to various conditions such as the type of a cutting tool, the shape of a machining target, the quality of the machining target, or a machining condition. This embodiment will be described on the assumption that the determination criterion 1 is employed.

Referring back to FIG. 1, the memory 22 is formed of a semiconductor memory such as a dynamic random access memory (DRAM). The memory 22 stores data generated by execution of various types of processing by the CPU 21. The input unit 23 is formed of an input unit such as a keyboard and a mouse, or a touch panel. The input unit 23 accepts a user's input of various types of information into the life determination device 1. The display unit 24 is formed of a display unit such as a liquid crystal display (LCD). The display unit 24 displays results of various types of processing executed by the life determination device 1. The storage unit 25 is formed of a nonvolatile storage unit such as a hard disk or a flash memory. The storage unit 25 stores the program for the life determination processing, and image data of the machining surface of the work W captured by the imaging units 10A to 10C, etc. The communication unit 26 includes a communication interface that executes signal processing based on a predetermined communication standard such as a local area network (LAN) or a universal serial bus (USB). The communication unit 26 controls communication made by the life determination device 1 with an external device.

[Operation]

Figure 8:
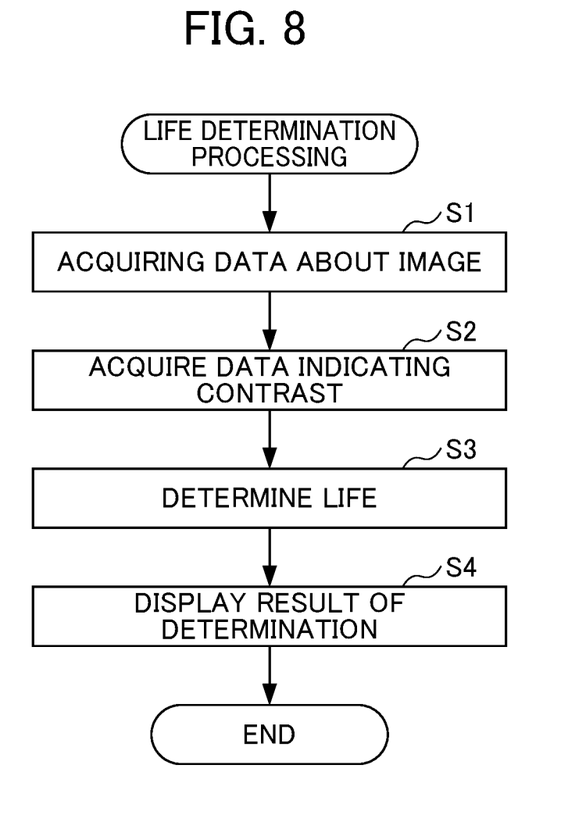
FIG. 8 is a flowchart showing a flow of life determination processing executed by the processor of the life determination device.

The operation of the life determination device 1 will be described next. FIG. 8 is a flowchart showing a flow of the life determination processing executed by the processor 20 of the life determination device 1. The life determination processing is started by input of an instruction to start the life determination processing given through the input unit 23.

When the life determination processing is started, the image acquiring unit 21*a* acquires image data of the machining surface of the work W captured by the imaging units 10A to 10C, and stores the acquired data in the storage unit 25 in step S1. The process in step S1 may be executed each time the imaging units 10A to 10C capture images of the machining surface of the work W. Alternatively, after the imaging units 10A to 10C capture images of machining surfaces of multiple works W, data about these images may be acquired together.

In step S2, the contrast acquiring unit 21*b* acquires data indicating contrasts (feature quantities) from the data about the images of the machining surfaces of the multiple works W stored in the storage unit 25. In step S3, the life determining unit 21*c* determines the life of a cutting tool based on the data indicating the contrasts acquired by the contrast acquiring unit 21*b*. More specifically, the life determining unit 21*c* determines the life of the cutting tool by determining a contrast in the data about each image based on the determination criterion 1 described above. In step S4, the life determining unit 21*c* displays a result of the determination of the life of the cutting tool. For example, if a contrast in the data about any of the images is determined to be the threshold or less used in the determination criterion 1, the life determining unit 21*c* determines that the cutting tool has reached the end of its life.

As described above, the life determination device 1 according to this embodiment captures images of the machining surfaces of the multiple works W from different directions after the multiple works W are subjected to machining by cutting. Based on change with time in contrasts (feature quantities) in the captured images of the machining surfaces, the life determination device 1 determines the life of a cutting tool. Specifically, the life determination device 1 acquires images of the machining surface of the same work W captured from respective different directions. Thus, the shape of the machining surface of the work W can be grasped more precisely. The life determination device 1 determines life based on a result of machining actually done by a cutting tool. Specifically, the life determination device 1 determines life based on a feature quantity indicating the quality of a result of the machining by cutting. This makes it possible to make a life determination more precisely using an element appearing directly in the quality of intended machining as a target of the determination, compared to making a determination of a state of wear of a cutting tool based on the shape of the cutting tool itself, for example. The life determination device 1 determines the life of a cutting tool based on change with time in a result of machining done by the cutting tool. This makes it possible to make a life determination reflecting the state of the cutting tool more precisely, compared to making a determination of the life of the cutting tool based on a result of machining done only once. As described above, the life determination device 1 according to this embodiment is capable of more appropriately determining the life of a cutting tool.

The present invention is not limited to the above-described embodiment but can be changed, if appropriate. For example, the robot M1 for gripping the imaging units 10A to 10C and the robot M2 for gripping the work W can be realized in both of the following ways: the robots M1 and M2 are used both as a facility installed on a production line, etc. for implementing a machining step on the work W and as a facility for determining the life of a cutting tool; and the robots M1 and M2 are installed for determining the life of the cutting tool separately from such a facility installed on a production line.

According to the above-described embodiment, imaging conditions under which the imaging units 10A to 10C capture images of the machining surfaces of multiple works W are parameters including a shutter speed, an aperture value, an angle of view, the brightness level of illumination, sensitivity, and white balance, etc. equally set for the multiple works W. Meanwhile, imaging conditions (parameter types), under which images of the machining surfaces of the multiple works W and set equally for the multiple works W, can be selected and decided appropriately in a manner that depends on the feature of a subject of the imaging such as the size of the work W or the shape of the machining surface of the work W, for example.

In the above-described embodiment, for making a determination based on the life determination criterion for a cutting tool, if data about time-series images captured by any of the imaging units 10A to 10C satisfies the determination criterion, the cutting tool can be determined to have reached the end of its life. Alternatively, a cutting tool can be determined to have reached the end of its life if data about time-series images captured by two or all of the imaging units 10A to 10C satisfies the determination criterion.

In the above-described embodiment, for making a determination based on the life determination criterion for a cutting tool, the determination can be made using a result of statistical processing on data about contrasts over a predetermined period of time. For example, the determination can be made using an average or a maximum of the contrasts over the predetermined period of time. As another example, the determination can be made on data about a contrast as a target obtained by excluding a predetermined number of data segments about high contrast values or a predetermined number of data segments about low contrast values from the contrasts over the predetermined period of time. As a result of such processing, the occurrence of an erroneous determination due to variation in contrasts acquired from image data can be reduced.

In the above-described embodiment, for making a determination based on the life determination criterion for a cutting tool, a contrast can be determined in association with the type of machining by cutting on the work W. For example, a determination criterion may differ between the case where machining by cutting on the work W is up cutting and the case where the machining by cutting on the work W is down cutting. This makes it possible to more appropriately determine the life of the cutting tool in a manner that conforms to the type of the machining by cutting.

In the above-described embodiment, for making a determination based on the life determination criterion for a cutting tool, a contrast can be determined in association with information relating to machining by cutting held by a machining device responsible for machining by cutting. For example, different determination criteria can be set in a manner that depends on a condition for the machining by cutting set by the machining device or the cutting resistance value of the work W. This makes it possible to more appropriately determine the life of the cutting tool while reflecting a specific situation during the machining by cutting.

In the above-described embodiment, a contrast is used as an example of a feature quantity indicating the quality of a result of machining by cutting. Meanwhile, a feature quantity indicating the quality of a result of machining by cutting can be data other than a contrast. Specifically, a feature quantity indicating the quality of a result of machining by cutting can be different data extractable from an image of the machining surface of the work W. This data can be the strength of an edge in an image of the machining surface of the work W, or gradation determined by colors or brightness, for example.

The life determination device 1 according to the above-described embodiment can be achieved entirely or partially by hardware, software, or a combination of hardware and software. Achieving the life determination device 1 by software means achieving the life determination device 1 by reading and executing a program with a computer. If the life determination device 1 is configured by hardware, the life determination device 1 can be configured partially or entirely using an integrated circuit (IC) such as a large scale integrated circuit (LSI), an application specific integrated circuit (ASIC), a gate array, or a field programmable gate array (FPGA), for example.

If the life determination device 1 is configured entirely or partially by software, the life determination device 1 can be achieved in a computer including a storage unit such as a hard disk or a ROM, storing programs describing the operation of the life determination device 1 entirely or partially, a DRAM storing data necessary for calculation, a CPU, and a bus for interconnection between all the units. In this computer, the life determination device 1 can be achieved by storing information necessary for the calculation into the DRAM and making the CPU execute the programs.

These programs can be stored using various types of computer-readable media and can be supplied to a computer. The computer-readable media include various types of tangible storage media. Examples of the computer-readable media include a magnetic recording medium (a flexible disk, magnetic tape, or a hard disk drive, for example), a magneto-optical recording medium (a magneto-optical disk, for example), a CD read only memory (CD-ROM), a CD-R, a CD-R/W, and a semiconductor memory (a mask ROM, a programmable ROM (PROM), an erasable PROM (EPROM), a flash ROM, or a random access memory (RAM), for example). The above-described programs can be distributed by being downloaded to a user's computer through a network.

While the embodiment of the present invention has been shown in detail, the foregoing description of the embodiment merely shows particular examples to be employed for implementing the present invention. The technical scope of the present invention is not to be limited to the above-described embodiment. Various changes of the present invention can be devised in a range not departing from the scope of the invention, and these changes are also covered by the technical scope of the present invention.

EXPLANATION OF REFERENCE NUMERALS

1 Life determination device
10A to 10C Imaging unit
20 Processor
21 CPU
21a Image acquiring unit
21b Contrast acquiring unit
21c Life determining unit
22 Memory
23 Input unit
24 Display unit
25 Storage unit
26 Communication unit

What is claimed is:

1. A cutting tool life determination device for determining a remaining life of a cutting tool, said device comprising:
   an imaging unit that acquires image data of multiple images of a part captured from multiple directions, respectively, the part being a part of a target of machining by cutting and having been subject to the machining by cutting by the cutting tool;
   a memory that stores the acquired image data in association with a machining time-series; and
   a processor that:
      acquires a feature quantity of the machining in the multiple images stored in the memory that indicates a quality of the machining shown in the multiple images, wherein the characteristic of the feature quantity is a contrast within the images; and
      determines the remaining life of the cutting tool based on a variation range in the contrast.

2. The cutting tool life determination device according to claim 1,
   wherein the contrast in the images is an average of the contrast in the multiple images over a predetermined period of time.

3. The cutting tool life determination device according to claim 2, wherein the processor excludes at least a predetermined number of high values or a predetermined number of low values of the feature quantities from inclusion in the average.

4. A life determination method for determining a remaining life of a cutting tool, said method comprising:
   acquiring with an imaging unit image data of multiple images of a part captured from multiple directions, respectively, the part being a part of a target of machining by cutting and having been subject to the machining by cutting by the cutting tool;
   storing in a memory the acquired image data in association with a machining time-series;
   acquiring with a processor a feature quantity of the machining in the multiple images stored in the memory that indicates a quality of the machining shown in the multiple images, wherein the characteristic of the feature quantity is a contrast within the images; and
   determining, with the processor, the remaining life of the cutting tool based on a variation range in the contrast.

5. A non-transitory computer-readable recording medium having stored thereon a program for causing a computer to execute:
   acquiring with an imaging unit image data of multiple images of a part captured from multiple directions, respectively, the part being a part of a target of machining by cutting and having been subject to the machining by cutting by a cutting tool;
   storing in a memory the acquired image data in association with a machining time-series;
   acquiring a feature quantity of the machining in the multiple images stored in the memory that indicates a quality of the machining shown in the multiple images, wherein the characteristic of the feature quantity is a contrast within the images; and determining the remaining life of the cutting tool based on a variation range in the contrast.

6. A cutting tool life determination device for determining a remaining life of a cutting tool, said device comprising:
- an imaging unit that acquires image data of multiple images of a part captured from multiple directions, respectively, the part being a part of a target of machining by cutting and having been subject to the machining by cutting by the cutting tool;
- a memory that stores the acquired image data in association with a machining time-series; and
- a processor that:
  - acquires a feature quantity of the machining in the multiple images stored in the memory that indicates a quality of the machining shown in the multiple images, wherein the characteristic of the feature quantity is a contrast within the images; and
  - determines the remaining life of the cutting tool based on similarity between the acquired feature quantity of the machining in the multiple images and data regarding the contrast obtained by one or multiple cutting tools used in the past.

7. A life determination method for determining a remaining life of a cutting tool, said method comprising:
- acquiring with an imaging unit image data of multiple images of a part captured from multiple directions, respectively, the part being a part of a target of machining by cutting and having been subject to the machining by cutting by the cutting tool;
- storing the acquired image data into a memory in association with a machining time-series;
- acquiring with a processor a feature quantity of the machining in the multiple images stored in the memory that indicates a quality of the machining shown in the multiple images, wherein the characteristic of the feature quantity is a contrast within the images; and
- determining, with the processor, the remaining life of the cutting tool based on similarity between the acquired feature quantity of the machining in the multiple images and data regarding the contrast obtained by one or multiple cutting tools used in the past.

8. A non-transitory computer-readable recording medium having stored thereon a program for causing a computer to execute:
- acquiring with an imaging unit image data of multiple images of a part captured from multiple directions, respectively, the part being a part of a target of machining by cutting and having been subject to the machining by cutting by a cutting tool;
- storing the acquired image data into a memory in association with a machining time-series;
- acquiring a feature quantity of the machining in the multiple images stored in the memory that indicates a quality of the machining shown in the multiple images, wherein the characteristic of the feature quantity is a contrast within the images; and
- determining the remaining life of the cutting tool based on similarity between the acquired feature quantity of the machining in the multiple images and data about the contrast obtained by one or multiple cutting tools used in the past.

* * * * *